United States Patent [19]

Cyphelly

[11] 4,113,171
[45] Sep. 12, 1978

[54] VALVE ARRANGEMENT FOR LIMITING TORQUE OF A HYDRAULIC MOTOR OF A CENTRIFUGE

[76] Inventor: Ivan Jaroslav Cyphelly, Neuhaus, Hinteregg, Switzerland, 8128

[21] Appl. No.: 786,844

[22] Filed: Apr. 12, 1977

[30] Foreign Application Priority Data

Apr. 14, 1976 [CH] Switzerland .................. 4777/76
Mar. 21, 1977 [CH] Switzerland .................. 3516/77

[51] Int. Cl.$^2$ .......................... B04B 1/20; B04B 9/10
[52] U.S. Cl. .................................. 233/7; 233/19 R; 233/24
[58] Field of Search ............ 233/7, 19 R, 19 A, 23 R, 233/24, 25

[56] References Cited

U.S. PATENT DOCUMENTS 3,734,399  5/1973  Oas ................................. 233/7
3,923,241  12/1975  Cyphelly ........................... 233/7

Primary Examiner—George H. Krizmanich
Attorney, Agent, or Firm—Browdy and Neimark

[57] ABSTRACT

A valve arrangement limits the torque of a hydraulic motor of a centrifuge by adjusting the flow of a pressure medium supplied by a pressure source. Adjustment of the delivered flow of pressure medium is accomplished either by direct adjustment of a pump or by adjustment of a flow-measuring throttle element associated with a pressure source. A pushing element is mounted in a valve housing as an adjusting element which is exposed to the pressure of the pressure medium and rests against a spring. An adjustable auxiliary valve is provided which opens an overpressure channel to a part of the pressure medium when a certain threshold pressure is reached, thus increasing abruptly the flow of pressure medium which is delivered.

17 Claims, 12 Drawing Figures

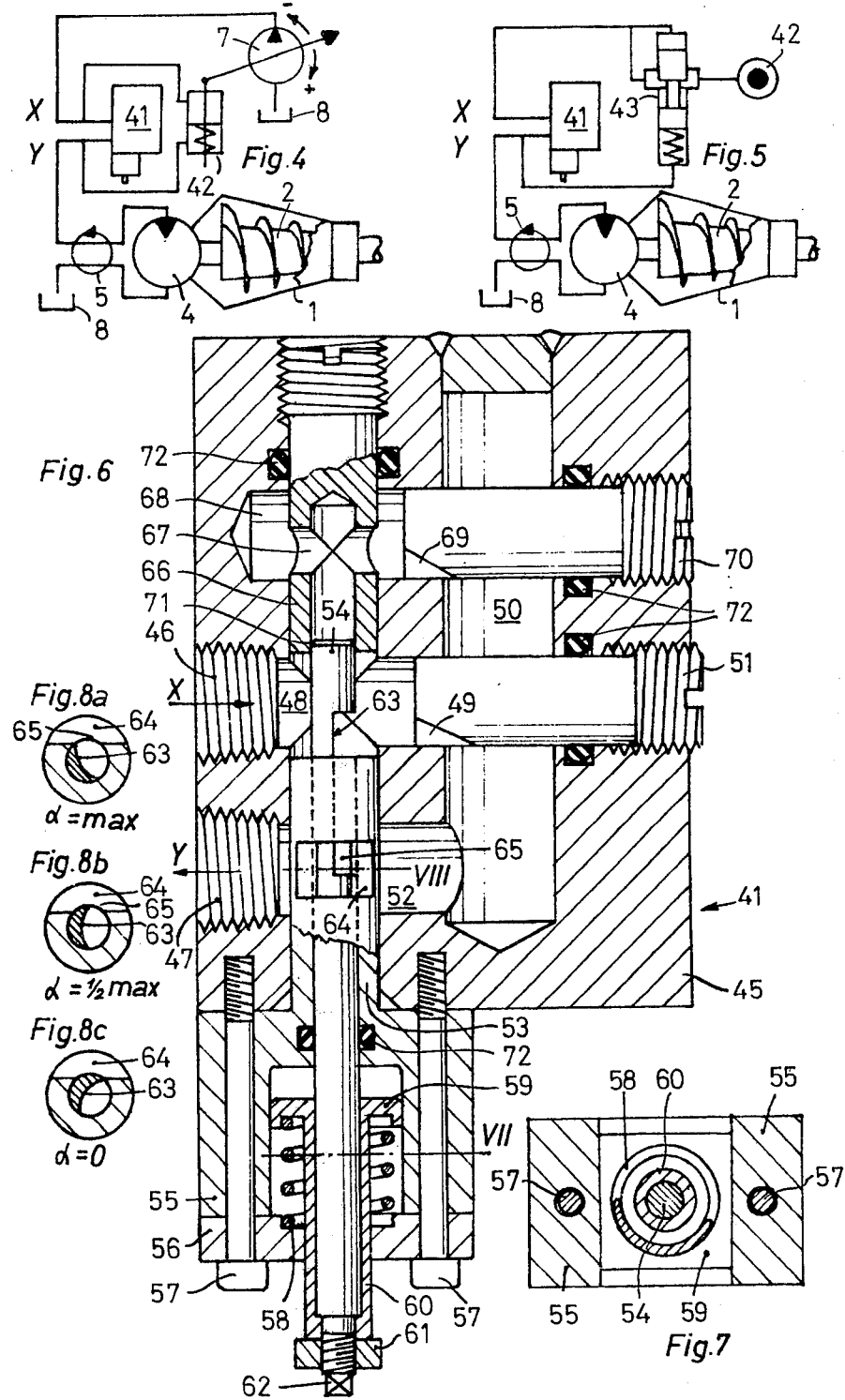

VALVE ARRANGEMENT FOR LIMITING TORQUE OF A HYDRAULIC MOTOR OF A CENTRIFUGE

FIELD OF THE INVENTION

The present invention relates to a valve arrangement for limiting the torque of a hydraulic motor of a centrifuge by adjusting the flow of a pressure medium supplied by a pressure source, whereby the housing of the hydraulic motor is firmly connected with a centrifuge drum driven by a main drive motor and the shaft of the hydraulic motor is firmly connected with a worm located inside the drum, in order to produce a slip speed between the drum and the worm, and whereby the flow of pressure medium which is supplied is controlled either by a direct adjustment of a pump or by adjustment of a flow-measuring throttle element associated with the pressure source. The pressure medium is fed to the hydraulic motor through rotating ducts, as is known for example from U.S. Pat. No. 3,923,241.

BACKGROUND OF THE INVENTION

In order to automate the slip speed in a centrifuge such as described above, remote control of the adjustment of the flow of pressure medium supplied by the pressure source, i.e., for example the adjustment of a pump, must be possible, for example by means of an electromechanical or electrohydraulic adjusting element. However, since such an arrangement is very expensive, fine adjustment is often eliminated in favor of a makeshift arrangement involving switching one or more pumps with fixed displacement volumes on and off by means of solenoid valves, so that a slip speed more or less adjusted to the operating state of the centrifuge can be established, at least in steps.

However, it is desirable to have fine adjustment of the supply flow without electrical adjusting elements, since an abrupt adjustment can affect centrifuging and electrical components can have a considerable negative effect on ensuring complete explosion protection.

SUMMARY OF THE INVENTION

An object of the present invention is to provide a valve arrangement which allows continuous control of slip speed in a centrifuge of the type described hereinabove without using electrical components. In addition, an object of the present invention is to provide a valve arrangement which permits instantaneous increase of the slip speed when there is a danger of the centrifuge jamming.

The valve arrangement according to the present invention is based on the fact that the adjustment of the flow of pressure medium which is supplied, i.e., for example the pump adjustment, is influenced by the presure of the pressure medium as a measure of the operating state of the centrifuge.

According to the present invention, the valve arrangement of the type described hereinabove is characterized by the fact that a sliding element is mounted in a valve housing, said element serving as an adjusting element and being exposed to the pressure of the medium and supported against a spring, and by the fact that an adjustable auxiliary valve is provided, which opens a bypass channel to a portion of the pressure medium when the pressure medium reaches a certain threshold pressure, so that the flow of pressure medium which is supplied increases abruptly.

This makes it possible to combine a progressive, pressure-dependent adjustment with the desired switching effect at higher pressure when there is a danger of jamming, without eliminating the manual adjustability of the slip speed and switching speed, as will be described hereinbelow.

A preferred embodiment of the valve arrangement according to the present invention for adjusting a pump provided with an adjusting element consists in the fact that the pushing element comprises an axially displaceable pin, said pin resting against the spring which in turn rests against the valve housing and is exposed to the pressure of the pressure medium which is supplied, and a piston, which is coaxial with respect to the pin, can be connected to the adjusting element of the pump, and is exposed to the pressure of the pressure medium, said piston having a pressure chamber on each side and being mechanically linked to the pin, in order to execute an axial movement which is proportional to the pressure of the pressure medium, and by the fact that the piston is provided with a throttle channel linking the two pressure chambers, to which channel the auxiliary valve is connected in order to cause the piston to move abruptly when the auxiliary valve opens. The slip speed can be adjusted manually before or during the operation of the centrifuge in such manner that the point of contact between the spring on which the axially movable pin rests, against the housing, is shifted in the direction of the pin. In addition, the switching speed can be changed by means of the adjustable auxiliary valve. Only the rate of adjustment of the progressive pressure-dependent pump adjustment cannot be changed during centrifuge operation, since the latter is a function of the stiffness of the spring on which the axially movable pin rests.

However, if the adjustment rate that can be adjusted during operation is desired, it is necessary to resort to a feed-flow-controlled adjusting pump with feed flow adjustment through a flow-measuring adjusting throttle in the supply line. A pressure-dependent adjustment throttle then makes it possible, in addition to all the functions of direct pump adjustment, to also meet the requirement for adjustability of the adjustment rate.

A further preferred embodiment of the valve arrangement according to the invention, which comprises a throttle element which measures the flow and must be adjusted, consists in the fact that the flow-measuring throttle element is provided with an inlet and an outlet for connecting the flow of pressure medium which is supplied, in the fact that the pushing element mounted in a housing of the throttle element comprises a pusher axially movable in a sleeve, said pusher resting against a spring which in turn rests against the housing and is exposed to the pressure of the pressure medium at the inlet, in the fact that a first throttle path, located between the inlet and the outlet, acting as a throttle opening, contains a recess in the pusher and a diaphragm opening in the sleeve associated with the recess, in such manner that the flow of pressure medium in the first throttle path changes as a function of the pressure of the pressure medium at the inlet, and in the fact that a second throttle path, located between the inlet and the outlet, comprises a throttle opening which is opened by the pusher when the latter is in a certain position, in such manner that when this throttle opening is opened, the flow of pressure medium between the inlet and the outlet increases abruptly. In this embodiment, the pusher can be mounted rotatably in the sleeve in such manner that, by rotating the pusher in the sleeve, the width of the throttle opening of the first throttle path is adjustable, said throttle opening being formed by the recess in the pusher and the diaphragm opening in the sleeve, and thus resulting in a rate of adjustment for the supply flow which can be adjusted at will as a function of the pressure by means of the axial movement of the pusher. The hydraulic parallel connection of this pressure-dependent throttle opening with an adjustable throttle, said throttle however being opened only above a certain pressure by a manometric pusher, and with an adjustable main throttle, produces an adjustable throttle which is very well suited to centrifuge operation, which in turn determines the pump flow through adjustment of the displacement volume or via flow valve adjustment according to the main parameters of slip speed, adjustment rate, and switching speed as a function of operating pressure.

BRIEF DESCRIPTION OF THE DRAWINGS

Embodiments of the valve arrangement according to the invention and its operation are described hereinbelow with reference to the drawings.

FIGS. 4 and 5 show two different possible circuits for a pressure-dependent adjusting throttle as a control throttle for an adjusting pump (FIG. 4) and as a control throttle for a flow control valve (FIG. 5).

FIG. 6 is a cross section through a pressure-dependent adjusting throttle.

FIG. 7 is a cross section along line VII in FIG. 6.

FIGS. 8a, b, c show three different rotational positions of the manometric pusher relative to the slot diaphragm shown in cross section along line VIII in FIG. 6.

DETAILED DESCRIPTION OF PREFERRED EMBODIMENTS

Figures 1, 2:
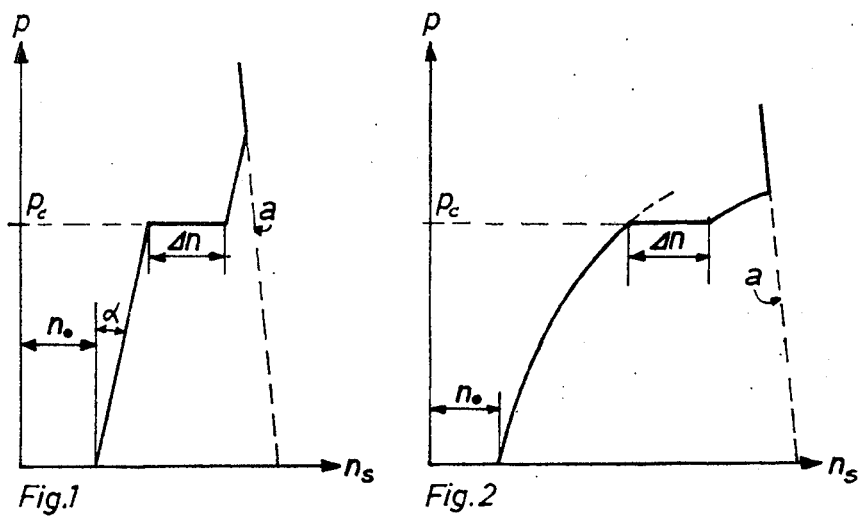
FIGS. 1 and 2 show two different curves for slip speed required in a centrifuge, as a function of operating pressure.

The graph shown in FIG. 1, which represents slip speed $n_s$ as a function of operating pressure $p$, corresponds to the usual requirements for speed controls: the slip speed $n_o$ set at idle, can be adjusted automatically with increasing load at a rate which corresponds to angle $\alpha$ to a point close to the jamming torque which is proportional to the pressure $P_c$. As a safety measure, an adjustable additional speed $\Delta n$ should be added at $P_c$ allowing the centrifgue to coast. The balance of the curve is covered only in case of malfunction, in other words cases when, after the centrifuge is allowed to coast, the torque between the worm and drum does not decrease, contrary to expectation. After a further increase in speed with pressure, the feed limit of the pump, represented by line $a$, is reached and the pressure then rises rapidly as a result of the slightly decreasing speed; in this case, the machine must be shut off immediately.

As shown in FIG. 2, in the case of poor sedimentation in the centrifuge, a variable adjustment rate can be applied, in the phase of increasing torque load, to pressure $p$, in such manner that the gradual transition from the slip speed control to coasting is permitted (FIG. 2). In this way, the separation process is spared excessively rough vibration.

Figure 3:
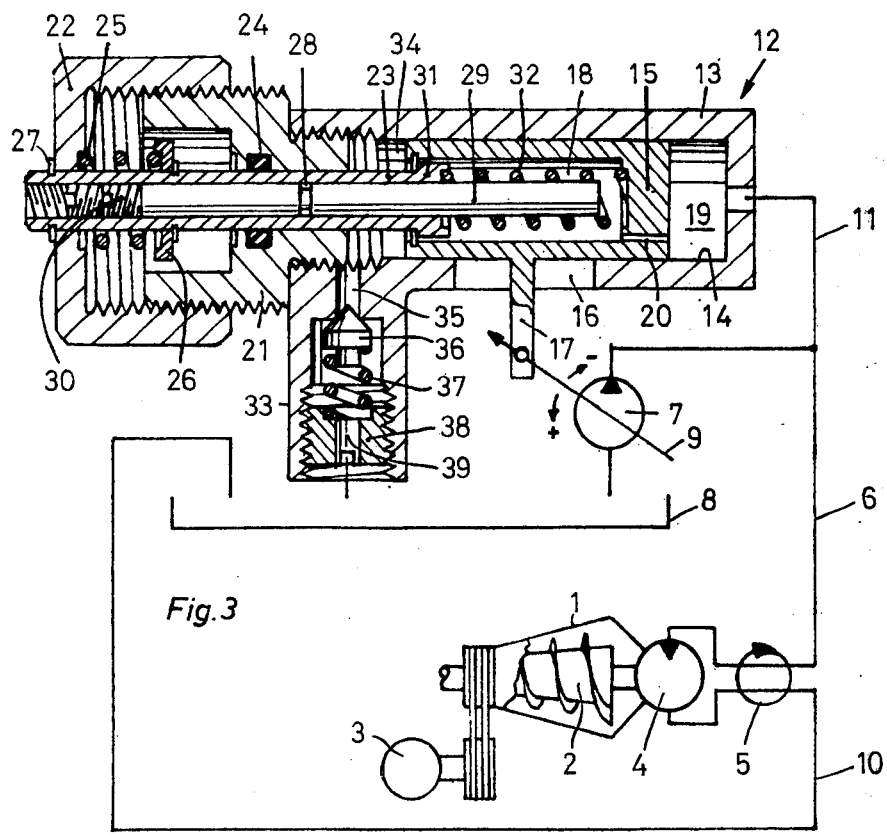
FIG. 3 is a cross section through an adjustment valve for direct connection to the adjustment mechanism of a feed pump.

FIG. 3 shows an adjusting valve together with a centrifuge and an adjusting pump, said valve conforming to the curve shown in FIG. 1 which represents the slip speed as a function of operating pressure.

In known fashion, a centrifuge, consisting of a drum 1 and a worm 2 mounted therein is provided with a main drive 3 for drum 1 and a schematically shown hydraulic motor 4 for producing a slip speed between drum 1 and worm 2, whereby the housing of hydraulic motor 4 is firmly connected to drum 1 and its shaft is firmly connected to worm 2. The hydraulic medium is supplied to and carried away from the hydraulic motor 4 via schematically represented rotating ducts 5. A supply line 6 is fed by a schematically represented adjusting pump 7, which draws the hydraulic medium out of reservoir 8. The adjusting mechanism of adjusting pump 7 is shown schematically as a rotatable adjusting element 9. The hydraulic medium is returned from hydraulic motor 4 to reservoir 8 through line 10.

An adjusting valve 12 is connected to adjusting pump 7 by means of a stub 11, said valve having a housing 13. A stop piston 15 is mounted in a bore 14 of housing 13, said piston being made in the form of a hollow piston and being provided with a pin 17 which fits through a housing opening 16, said pin being coupled in a manner shown purely schematically with adjusting element 9 of adjusting pump 7. Hence, axial movement of stop piston 15 causes adjustment of adjusting pump 7. Chamber 18 of stop piston 15 is connected to pressure chamber 19 of bore 14 via a capillary 20.

A plug 21 is screwed in bore 14 at the end of housing 13 opposite the point of connection of stub 11, said plug also being provided with an external thread on which a cap 22 is screwed. A manometric pin 23 is mounted axially displaceably in a coaxial bore of the plug, and is sealed in the plug bore by an elastic sealing ring 24. A compression spring 25 surrounding pin 23 is located inside plug 21 and cap 22, said spring resting on one side against the bottom of cap 22 and on the other side against a plate mounted on pin 23.

Since pin 23 is also brought out through a bore in cap 22 and rests against the end of cap 22 relative to one of its axial movement directions, in contact with a safety ring 27, the axial position of adjusting pin 23 can be adjusted by rotating cap 22.

Pin 23 is provided with a through lengthwise bore, in which a stop pin 29 sealed by a seal 28 is disposed, said pin having one end portion projecting into the interior 18 of stop piston 15 and having its other end resting against a screw arrangement 30 located in adjusting pin 23.

Pin 23 is also provided with a shoulder 31 against which stop piston 15 is pressed by a spring 32.

Housing 13 is provided with an overpressure valve 33, said valve being provided with a bore 35 connected with the chamber 34 located between stop piston 15 and pin 21, said bore being provided with a conical seal 36. The conical seal is exposed to the action of spring 37, resting on adjust screw 38, which is provided with bore 39 leading to reservoir 8.

The adjusting valve described hereinabove functions as follows:

Pressure p, produced at hydraulic motor 4 by the torque between worm 2 and drum 1, is fed through stub 11 to bore 14 of housing 13 (FIG. 1). Since overpressure valve 33 is closed, pressure p is forced through capillary 20 against the side of stop piston 15 with spring 32, i.e., into chamber 18. Thus, stop piston 15 is not exposed to any hydraulic force.

Accordingly, stop piston 15 is pressed by spring 32 against shoulder 31 of manometric pin 23, and therefore follows its axial movements.

An axial movement of pin 23 is produced on the one hand by rotating cap 22 on the external thread of plug 21. Thus, the axial position of cap 22, by means of adjusting pin 23, determines the axial position of stop piston 15 and therefore, by means of adjusting element 9 of adjusting pump 7, the zero-load slip speed $n_o$ (FIG. 1).

On the other hand, pin 23 and therefore stop piston 15 execute an axial movement when spring 25 is compressed by pressure p of adjusting pump 7 or hydraulic motor 4, acting on pin 23. When pressure p increases, spring 25 causes pin 23 to move by an amount which is proportional to pressure p, and therefore, by means of stop piston 15 and adjusting element 9, produces an appropriate adjustment of adjusting pump 7. The adjustment rate (angle $\alpha$ in FIG. 1) is thus determined by the stiffness of spring 25 and cannot be changed during operation.

However, if the threshold pressure $p_c$ of overpressure valve 33, set by means of set screw 38, is reached, the flow of the hydraulic medium, flowing through the open overpressure valve 33 to reservoir 8, produces a pressure drop through capillary 20 of stop piston 15. This pressure drop overcomes the force of spring 32, so that stop piston 15 suddenly moves against stop pin 29 and adjusting pump 7 is likewise abruptly adjusted. This causes the jump in slip speed $\Delta n$ shown in FIG. 1, whose magnitude is predetermined by the axial position of stop pin 29 relative to adjusting pin 31, adjustable by means of screw arrangement 30.

It should also be pointed out that stop piston 15 can also control a valve for adjusting the flow of pressure medium supplied from a pressure source to hydraulic motor 4, especially however an adjusting throttle, which in turn, as a flow-measuring adjusting throttle, controls a supply-flow-controlled adjusting pump or a pressure regulator of a flow regulator in a known fashion.

The two latter variations can be accomplished however by the embodiment (described hereinabove and shown in FIG. 6) of the valve arrangement according to the invention in a direct and advantageous manner without using a roundabout approach, whereby this additional embodiment makes possible an adjustment rate as shown in FIG. 2 which is adjustable or variable during operation.

The known principle by which an adjusting throttle can be used either as a flow-measuring point for pump adjustment or as a flow-measuring point for flow regulation via a pressure regulator will be described briefly with reference to FIGS. 4 and 5.

According to FIG. 4, the supply flow of pump 7 is conducted directly from inlet X to outlet Y of an adjusting throttle 41, before it drives worm 2 relative to drum 1 of the centrifuge in the manner described hereinabove, by rotating ducts 5 and hydraulic motor 4. Between inlet X and outlet Y of adjusting throttle 41, the corresponding pressure drop is tapped off at the adjusting throttle and fed to a manometric piston 42 of pump 7, which controls the pump in accordance with the setting of adjusting throttle 41.

According to FIG. 5, the supply flow comes from a pressure source 42 initially via a pressure regulator 43, controlled by adjusting throttle 41, and thence via inlet X and outlet Y to adjusting throttle 41. Thanks to this mechanism, a flow of hydraulic medium, determined by adjusting throttle 41, flows through hydraulic motor 4 to cause worm 2 to be driven relative to drum 1 of the centrifuge.

Such an arrangement is used preferably to power a plurality of centrifuges from the same pressure source.

The adjusting throttle 41 shown in FIG. 6 is provided with a housing 45 with a screw inlet 46 and a screw outlet 47, whereby inlet 46 corresponds to inlet X in FIGS. 4 and 5 and outlet 47 corresponds to outlet Y in FIGS. 4 and 5 for the pressure medium. Inlet 46 is followed by a first cross bore 48, which terminates in a lengthwise manifold bore 50 via an adjustable throttle 49. Adjustable throttle 49 is formed by a screw pin 51. A second cross bore 52, which likewise terminates in manifold 50, leads to outlet 47.

A sleeve 53 is located in the lengthwise direction in a corresponding bore, with a pin-shaped manometric pusher 54 located in said sleeve, said pusher passing through the two cross bores 48 and 52. Sleeve 53 is connected by means of a holder 55 with cover 56 and screws 57 to housing 45. Pusher 54 is subjected to the force of a spring 58 disposed inside holder 55, said spring resting on one side against cover 56 and on the other side against a plate 59, nonrotatably guided inside holder 55. Plate 59 is provided with a sleeve-like extension 60 which passes through cover 56 and fits around pusher 54, whereby a nut 61 is screwed onto the end part of 54, provided with a thread, to adjust the pretensioning of the spring. Nut 61 presses pusher 54 firmly against plate 59. The end of pusher 54 is made in the form of a square 62. FIG. 7 shows, in the form of a cross section along line VII in FIG. 6, how plate 59 is guided within holder 55.

Pusher 54 is provided with a groove 63 extending along its lengthwise direction, said groove on the one hand providing a passageway for the pressure medium from inlet 46 to sleeve 53 and on the other hand, together with a slit diaphragm 64 provided in sleeve 53, forming a throttle opening 65 which communicates with outlet 47 via cross bore 52.

The inner end part of pusher 54, with pusher 54 in the position shown, rests in another sleeve 66, screwed into housing 45, so that its axial position is adjustable. Sleeve 66 is provided with a cross bore 67, said bore located inside a third housing cross bore 68. Cross bore 68 terminates in lengthwise manifold bore 50 via a further adjustable throttle 69, whereby adjustable throttle 69 is in turn formed by a screw pin 70.

When pusher 54 is moved downward against the action of spring 58 at a certain operating pressure, the edge of the inner end of pusher 54 opens up the indicated path 71 to the hydraulic medium 71, from inlet 46 via cross bore 63 to the bore of sleeve 66, so that the hydraulic medium can reach outlet 47 via throttle 69.

A plurality of sealing rings 72 prevents the hydraulic medium from escaping from housing 45.

The present adjusting throttle 41 also has a hydraulic parallel arrangement of three individual throttle paths between inlet 46 and outlet 47, namely:

a pressure-independent adjustable throttle 49 for determining the zero-load slip speed $n_o$ (FIG. 2), throttle opening 65 which is progressively opened as manometric pusher 54 moves under the influence of pressure, said throttle opening being responsible for the adjustment rate $\alpha$ (FIG. 2), and throttle 69, opened by manometric pusher 54 at a certain pressure, to achieve the jump in speed $\Delta n$ (FIG. 2).

The force produced by the piston effect of manometric pusher 54 which is subjected to pressure is accepted by spring 58. The resultant axial movement of pusher 54 is used to gradually open throttle opening 65, which is formed by groove 63 and pusher 54 and the slit diaphragm 64 in covering sleeve 53.

The size of throttle opening 65, which is produced at a certain pusher travel, depends on the rotation of pusher 54 relative to cover sleeve 53. This rotation can be adjusted during operation after loosening nut 61 on square 62. FIGS. 8a, b, and c show three different rotary positions of pusher 54 relative to slit diaphragm 64, which correspond to various adjustment rate settings. If slit diaphragm 64 opens downward, throttle opening 65 will increase out of proportion with a greater pusher travel, i.e., at a higher operating pressure, producing an adjustment rate which is variable and corresponds to FIG. 2. In the limiting case, when $\alpha$ approaches 90°, this corresponds to control of the pressure or torque by increasing the slip speed, finding the slip speed for each operating state of the machine which produces the preset torque: the pressure-dependent adjusting valve is switched to full load control, which ensures the most economic operation of the centrifuge.

The axial movement of pusher 54 is also used at the inner, pressure-side end of the pusher to close or open feed 71 to adjustable throttle 69, whereby closing pressure $P_c$ is adjusted by axial adjustment of sleeve 66. This closing or opening then causes the abrupt change in speed $\Delta n$ according to FIG. 2.

FIG. 3 shows a valve arrangement in which an adjusting element coupled directly with the pump adjustment consists of a mechanical overlap of a manometric pin with a stop piston controlled via an overpressure valve.

In many applications, for process engineering reasons, only the manometric operating state is involved, i.e., a state in which the precontrolled stop piston is always pressed against the manometric pin. In these cases, it is advisable to avoid precontrol, without losing the damping effect of the latter. Of course, the measure according to the invention should be retained, namely, that in addition to the pressure-dependent progressive adjustment when there is a threat of jamming, there is a switching effect at higher pressure.

Figure 9:
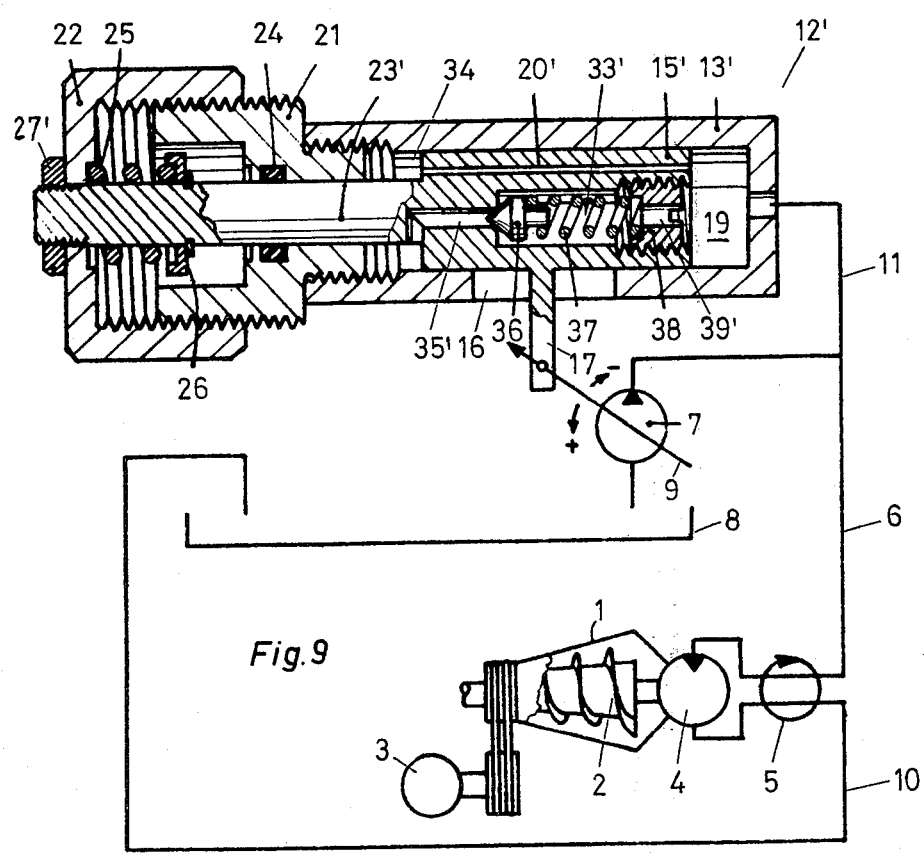
FIG. 9 is a cross section through another adjusting valve for direct connection to the adjusting mechanism of a feed pump.

The embodiment of the valve arrangement according to the invention described hereinbelow with reference to FIG. 9 is therefore intended to permit a damped adjustment of the speed between the worm and the drum of the centrifuge as a function of the operating pressure or the torque of the hydraulic motor without precontrol of a piston which affects the pump adjustment, i.e., without losses. This can be accomplished by the adjusting element or pushing element which is directly coupled with the adjusting element of the adjusting pump comprising a manometric differential piston, whose two pressure chambers are exposed to the operating pressure of the hydraulic medium, one directly and the other through a parallel shunt consisting of a throttle channel and an adjustable overpressure valve. This is essentially a damped, manometric adjustment element with cutout of damping at a certain overpressure, whereby the zero position and the spring pretensioning are adjustable. This embodiment consists essentially of that shown in FIG. 3, namely, pin 31 and stop piston 15 of FIG. 3 are made integral.

In FIG. 9, those parts which correspond to FIG. 3 are given the same reference numbers, while those parts which have a different shape but have the same function are marked with a prime.

According to FIG. 9, in the adjustment valve 12' shown, a differential piston 15' is disposed in the bore 14 of a cylindrical housing 13', said piston having a pin 17 for connection with adjusting element 9 of adjusting pump 7. Differential piston 15' is provided with a pin 23', said pin being guided through plug 21 screwed into housing 13' and supported by means of plate 26 on spring 25, said spring resting against cap 22 screwed onto plug 21. A spring pretensioning nut 27' is screwed onto the end part of pin 23' which projects beyond cap 22.

Stub 11 of adjusting pump 7 or hydraulic motor 4 is connected to one pressure chamber 19 of piston 15'. The other pressure chamber 34 is connected to the abovementioned pressure chamber 19 via a throttle 20' located in piston 15'. An overpressure valve 33' is located parallel to throttle 20' in piston 15', said valve having a bore 35' terminating in pressure chamber 34, the conical seal 36 corresponding to FIG. 3, and a bore 39' which terminates in pressure chamber 19, whereby, likewise according to FIG. 3, conical seal 36 is exposed to the pressure of spring 37, said spring resting against adjusting screw 38, said screw being provided with bore 39'.

The valve arrangement disclosed hereinabove functions as follows:

Adjusting pump 7 which powers hydraulic motor 4 is controlled by differential piston 15' in bore 14 of housing 13'. Pressure $p$, produced at hydraulic motor 4 by the torque between worm 2 and drum 1, is fed to bore 14 through stub 11, whereby this pressure squeezes through throttle 20' into pressure chamber 34 of piston 15' and, as a result of the difference in area, exerts a pressure on the pretensioned spring 25. In this state, therefore, piston 15' participates in the axial movement (by means of piston pin 23') which is caused by the rotation of adjusting cap 22 on the thread of plug 21; this corresponds to the minimum speed and adjustment $n_o$. If the compressive force exceeds the pretensioning of spring 25, the actual control process begins, wherein the liquid contained in pressure chamber 34 must be forced leftward through throttle 20' under the influence of the movement of piston 15', which limits the slip speed adjustment rate. However, if the operating state of the centrifuge requires a rapid increase in slip speed, i.e., an unrestricted movement of piston 15' leftward, the opening of the overpressure valve 33' consisting of adjusting screw 38, load spring 39, and conical seal 36 will short-circuit restriding throttle 20'. Piston 15' pushes adjusting element 9 of pump 7 to the top speed position, whereby the threat of stoppage or jamming of the centrifuge is avoided.

Figure 10:
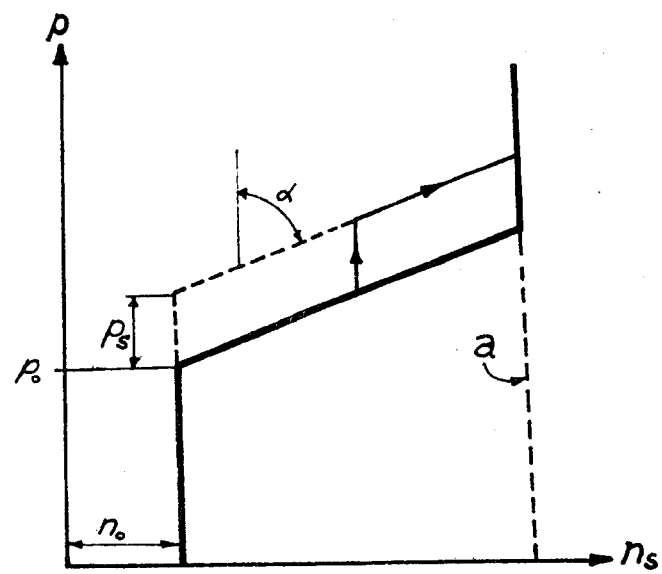
FIG. 10 shows the curve of slip speed as a function of operating pressure for the adjusting valve in FIG. 9.

In the valve arrangement according to FIG. 9, the curve representing slip speed $n_s$ as a function of operating pressure $p$ differs from that in the sample embodiment according to FIG. 3, shown in FIG. 1. In FIG. 10, this different curve is shown for the valve arrangement in FIG. 9.

The set speed $n_o$ is maintained as the pressure increases until the spring lifts off the stop at pressure $p_o$ and the speed gradually increases as the pressure increases slightly. The increase in speed is limited by the delivery limit a of the adjustable pump, whereby the adjustment rate $a$ (increase in speed relative to pressure rise) is a function of the stiffness of the spring. The increase in speed lags behind the pressure rise as a result of damping, provided this lag produces a smaller pressure difference than pressure $p_s$. However, as soon as jamming or stoppage begins, and pressure $p_s$ is reached, the speed abruptly increases up to the value preset by the delivery limit, as shown in FIG. 10 by the curve marked with the arrows.

It will be obvious to those skilled in the art that various changes may be made without departing from the scope of the invention and the invention is not to be considered limited to what is shown in the drawings and described in the specification.

What is claimed is:

1. A valve arrangement for limiting the torque of a hydraulic motor of a centrifuge by adjusting the flow of a pressure medium supplied by a pressure source, wherein said hydraulic motor includes a housing and a shaft and said centrifuge includes a drum, driven by a main drive motor and a worm mounted inside said drum, and further wherein said hydraulic motor housing is firmly connected to said centrifuge drum and said hydraulic motor shaft is firmly connected with said centrifuge worm, in order to produce a slip speed between said drum and said worm, said valve arrangement being arranged to adjust the delivered flow of pressure medium by directly adjusting a pump or by adjusting a flow-measuring throttle element associated with a pressure source, said valve arrangement comprising:

a valve housing;
   a spring disposed within and resting against said valve housing;
   a pushing element means, mounted in said valve housing against said spring and being exposed to the pressure of the pressure medium, for causing adjustment of the delivered flow of pressure medium; and
   adjustable auxiliary valve means for opening an overpressure channel to a part of the pressure medium when a certain threshhold pressure of the pressure medium is reached, in such manner that the flow of pressure medium which is delivered increases abruptly.

2. A valve arrangement in accordance with claim 1, for direct adjustment of a pump, wherein
   said pushing element means comprises an axially movable pin, said pin resting against said valve housing, a piston coaxial with said pin and connectable to an adjusting element of the pump, first and second pressure chambers disposed within said valve housing on each side of said piston, said first pressure chamber having a larger axially cross-sectioned area than that of said second pressure chamber, said first chamber being exposed to the pressure of the pressure medium and being connected to said second chamber by a throttle channel, said piston being coupled with said pin in order to execute an axial movement proportional to the pressure of the pressure medium;
   and wherein the overpressure channel of said adjustable auxiliary valve means is connected to said second chamber, when said auxiliary valve means is open, in order to cause substantial evacuation of said second chamber and thus an abrupt axial movement of said piston.

3. A valve arrangement in accordance with claim 1, for adjustment of a flow measuring throttle element associated with a pressure source, said valve arrangement being disposed within a flow-measuring throttle element provided with an inlet from a pressurized pressure medium source and an outlet for delivering the delivered flow of pressure medium, said valve housing being said throttle housing,
   wherein said pushing element means comprises a sleeve disposed within a first bore in said valve housing, a pusher, axially movable within said sleeve, said pusher resting against said spring and said spring resting against said valve housing, said pusher being exposed to the pressure of the pressure medium at the throttle inlet, said pusher having a recess therein providing pressure medium communication between said inlet and the interior of said sleeve, and said sleeve having a slot opening providing communication between the interior of said sleeve and said outlet, said inlet, said pusher recess, said sleeve slot opening and said outlet forming a first throttle path in which the flow of pressure medium changes as a function of the pressure of the pressure medium at the inlet,
   and wherein said overpressure channel of said adjustable auxiliary valve means is in communication with said outlet and, when said valve means is open, is in communication with said inlet, thus forming a second throttle path, said valve means automatically opening when said pusher has advanced to a predesigned position, thereby opening said second throttle path and abruptly increasing the flow of pressure medium between said inlet and said outlet.

4. A valve arrangement in accordance with claim 2, wherein said piston is provided with a stub projecting through an opening in said valve housing for connection with the adjusting element of the pump.

5. A valve arrangement in accordance with claim 2, wherein said piston is in the form of a hollow piston whose end wall delimits said first pressure chamber together with the interior walls of said valve housing, wherein said valve housing has an opening for admitting the pressure medium supplied, wherein the interior of said hollow piston is part of said second pressure chamber, wherein one end of said pin is located in the interior of said hollow piston, said end being provided with a shoulder, wherein said throttle channel comprises a capillary bore passing through the end wall of said piston thereby connecting said first chamber with the interior of said hollow piston and said second chamber, and further including second spring means within said hollow piston for pressing the end of the open side of said piston against the shoulder of said pin.

6. A valve arrangement in accordance with claim 5 further including a cap adjustably screwed on to one end of said valve housing, and wherein said spring, pressing against said pin, rests against the inside of said adjustable cap.

7. A valve arrangement in accordance with claim 5 wherein said overpressure channel, when said auxiliary valve means is open, communicates between said second chamber and a zero-pressure pressure medium reservoir.

8. A valve arrangement in accordance with claim 5 wherein said pin is provided with an axial bore, and further including a stop pin, projecting into the interior of said hollow piston, axially adjustably connected to the bore of said pin, whereby the axial movement of said piston with respect to said pin, when said auxiliary valve is opened, is limited by said stop pin.

9. A valve arrangement in accordance with claim 2, wherein said piston is fixedly connected to said pin, wherein said valve housing has an opening for admitting the pressure medium supplied and wherein said throttle channel comprises a capillary bore passing through said piston.

10. A valve arrangement in accordance with claim 9 wherein the overpressure channel, having a diameter greater than said axial capillary throttle bore, of said auxiliary valve, is disposed within said piston parallel to said axial throttle bore such that when open said second chamber is in free fluid communication with said first chamber.

11. A valve arrangement in accordance with claim 9 further including a cap adjustably screwed on to one end of said valve housing, and wherein said spring, pressing against said pin, rests against the inside of said adjustable cap.

12. A valve arrangement in accordance with claim 3 further including a third throttle path between said inlet and said outlet and a pressure-independent, adjustable throttle disposed within said third throttle path for determining the zero-load slip speed.

13. A valve arrangement in accordance with claim 3 wherein said pusher is rotatably mounted in said sleeve and is rotationally adjustable, whereby the relative rotational positions of said pusher recess and said sleeve slot opening can be set to thereby vary the effect of a change in the flow of pressure medium in said first throttle path.

14. A valve arrangement in accordance with claim 3 further including a second sleeve, within the first bore in said valve housing, disposed such that one end region of said second sleeve is located in the vicinity of one free end of said pusher, means for adjusting the axial position of said second sleeve relative to said pusher, and a pressure-independent throttle disposed within said second throttle path.

15. A valve in accordance with claim 12 wherein said pressure-independent, adjustable throttle includes a screw pin disposed in a bore of the throttle housing for adjusting the size of the throttle opening.

16. A valve in accordance with claim 14 wherein said pressure-independent, adjustable throttle includes a screw pin disposed in a bore of the throttle housing for adjusting the side of the throttle opening.

17. A valve in accordance with claim 12 wherein said first, second and third throttle paths are arranged in parallel between said inlet and outlet, each of said throttle paths including longitudinal and transverse bores in said throttle housing.

* * * * *